US011493982B2

(12) United States Patent
Ivanchenko et al.

(10) Patent No.: US 11,493,982 B2
(45) Date of Patent: Nov. 8, 2022

(54) MICROCONTROLLER AND POWER MANAGEMENT INTEGRATED CIRCUIT APPLICATION CLUSTERING FOR SAFE STATE MANAGEMENT

(71) Applicant: Infineon Technologies AG, Neubiberg (DE)

(72) Inventors: Konstantin Ivanchenko, Munich (DE); Cristian Garbossa, Bressanone (IT); Bejoy Mathews, Oberhaching (DE)

(73) Assignee: Infineon Technologies AG, Neubiberg (DE)

( * ) Notice: Subject to any disclaimer, the term of this patent is extended or adjusted under 35 U.S.C. 154(b) by 47 days.

(21) Appl. No.: 17/152,862

(22) Filed: Jan. 20, 2021

(65) Prior Publication Data
US 2022/0229486 A1 Jul. 21, 2022

(51) Int. Cl.
*G06F 1/3234* (2019.01)
*G06F 1/3206* (2019.01)

(52) U.S. Cl.
CPC .......... *G06F 1/3243* (2013.01); *G06F 1/3206* (2013.01)

(58) Field of Classification Search
CPC .................................................. G06F 1/3243
See application file for complete search history.

(56) References Cited

U.S. PATENT DOCUMENTS

2016/0231799 A1* 8/2016 Birnie ...................... G06F 1/28
2018/0208236 A1* 7/2018 Asao ................... H02P 29/0241
2021/0111621 A1* 4/2021 Rince .................... H02M 1/088

FOREIGN PATENT DOCUMENTS

EP 3376342 A1 * 9/2018 ............... G06F 1/32

* cited by examiner

*Primary Examiner* — Suresh Suryawanshi
(74) *Attorney, Agent, or Firm* — Eschweiler & Potashnik, LLC

(57) ABSTRACT

Systems, methods, and circuitries are provided for controlling a microcontroller (MCU) on a per-application basis. A control system includes a microcontroller unit (MCU) including a first application group and a second application group. The first application group includes at least one hardware component not associated with the second application group. The control system includes a power management integrated circuit (PMIC). The PMIC includes monitoring circuitry configured to monitor the first application group to detect a first application group fault condition and monitor the second application group to detect a second application group fault condition. Based on the monitoring, the PMIC provides a first reset signal to the first application group that does not reset the second application group or provides a second reset signal to the second application group that does not reset the first application group.

21 Claims, 3 Drawing Sheets

MICROCONTROLLER AND POWER MANAGEMENT INTEGRATED CIRCUIT APPLICATION CLUSTERING FOR SAFE STATE MANAGEMENT

FIELD

The present disclosure relates to the field of integrated control systems that provide safe state operation in response to detection of faults and in particular to methods, systems, and in particular to systems that include a microcontroller and power management integrated circuit (IC).

BACKGROUND

Many control systems for automotive components include a safety interface between a microcontroller (MCU) that controls the automotive components and a power management IC (PMIC) that controls various power-related components (e.g., power supplies and voltage controllers) on the MCU. In response to certain hardware faults on the MCU the PMIC may respond by resetting a power-related component on the MCU.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Some safety interfaces between an MCU and PMIC allow for immediate and complete safety system activation upon detection of certain faults in the MCU. The interface may include functions for power management, failure monitors, and circuitry for activation of secondary safety elements. However, there is a trade-off between system availability and the scope of safety activation. For example, a fault in a power steering system may cause unrelated systems (engine/transmission electronic control unit (ECU)) to also be transitioned to a safe state operating mode.

Figure 1:
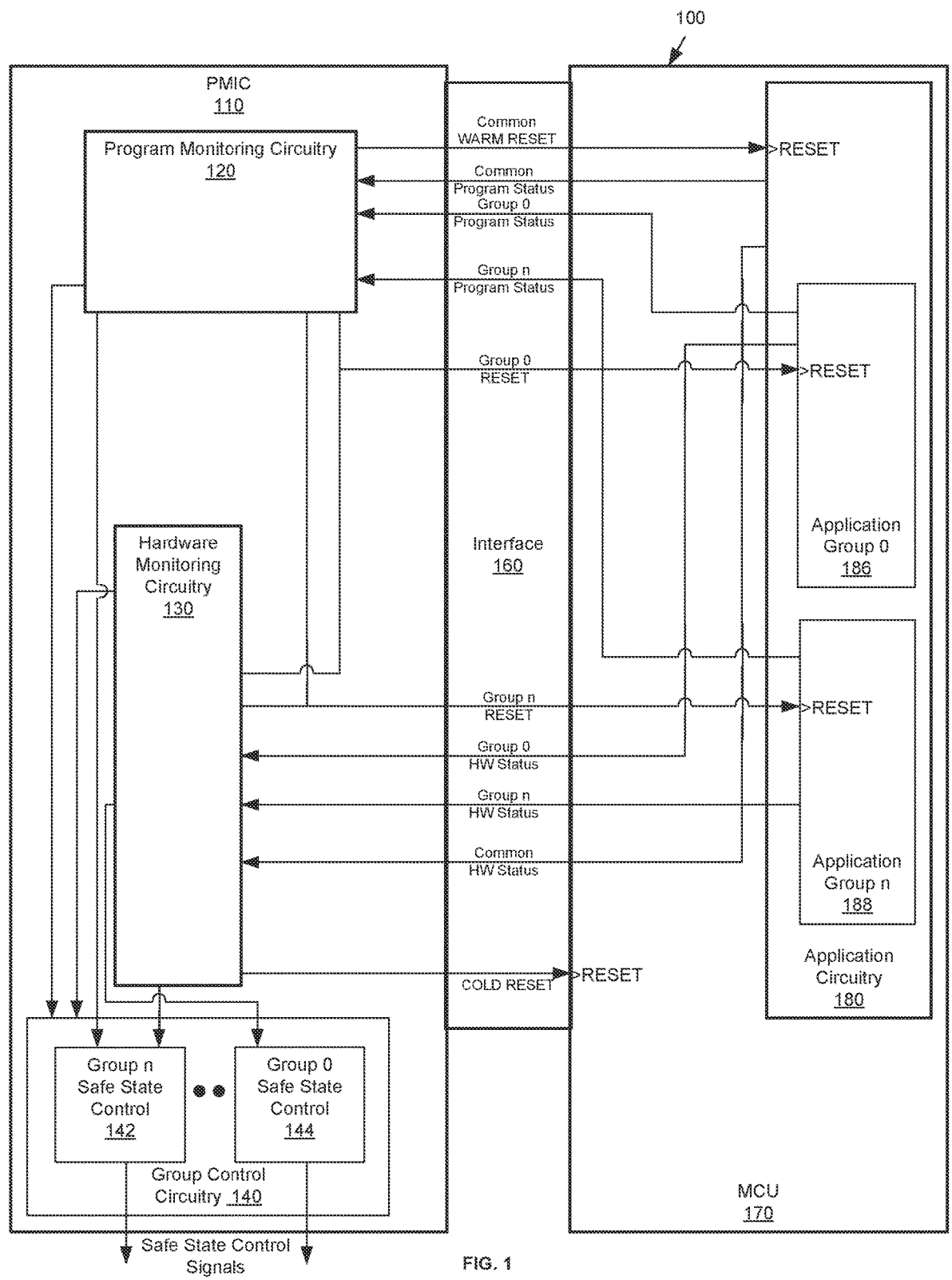
FIG. 1 is a block diagram of an exemplary control system that supports safety management on a per-application group basis, in accordance with various aspects described.

Described herein are control systems that support safety management on a per-application group basis. This increased granularity in fault detection/safety management may improve system availability. FIG. 1 illustrates an exemplary control system 100 that includes PMIC 110, interface 160, and MCU 170. The MCU 170 includes application circuitry 180 that includes hardware supporting execution of various applications that control different systems (e.g., various automotive systems in one example, however systems in other environments are contemplated). The hardware of the application circuitry 180 is divided into n application groups or domains, with each group being associated with execution of one or more applications. Each application group includes at least one dedicated hardware component that is capable of being reset or placed in a safe operating mode independent of (e.g., without affecting) hardware in other application groups. To support the grouping of applications, the MCU 170 may include additional or redundant hardware components in each application group.

The applications may be grouped in many ways. For example, application group 0 186 may include applications that perform redundant system functions (e.g., related to fail safe operation electric power steering). Application group n 188 may include applications associated with different systems that are related in some other way (e.g., powertrain and transmission which are controlled by a single ECU). As will be described with reference to FIG. 2 in some examples, the grouping of applications/hardware may be performed in a flexible manner that allows a safety system designer to designate which applications (and associated hardware) belong to which application groups.

Many system faults are correctable by the internal MCU functions, however the PMIC 110 is tasked with recovery and safety control in response to certain faults. To this end, the PMIC 110 includes program monitoring circuitry 120 and hardware monitoring circuitry 130. Program monitoring circuitry 120 monitors a "common" program status for software that is associated with the application circuitry 180 in general and/or controls functions of more than one application group. Such common software includes, for example, monitoring and fault detection functions for the overall MCU 170 performed by software executed by processors in the PMIC 110. The program monitoring circuitry 120 also separately monitors program status for each application group 186, 188. The program monitoring circuitry 120 is capable of providing reset signals to various power-related components on the MCU 170, such as power supplies. For example, the program monitoring circuitry 120 may be capable of providing a common "warm reset" signal to application circuitry 180 in which certain components common to multiple application groups are restarted (without interrupting power) and/or all application groups are restarted. The program monitoring circuitry 120 may also provide individual warm reset signals to individual application groups 186, 188.

The hardware monitoring circuitry 130 monitors a "common" hardware status for MCU hardware components that are associated with the application circuitry 180 in general and/or perform functions of more than one application group. Such hardware includes, for example, physical power supply rails provided to the MCU 170 including an I/O power supply rail, a reference power supply rail, an Ethernet power supply rail, a core power supply rail, and so on. The hardware monitoring circuitry 130 also separately monitors hardware status for each application group 186, 188. The hardware monitoring circuitry 130 is capable of providing reset signals to various power-related components on the MCU 170, such as power supplies. For example, the hardware monitoring circuitry 130 may be capable of providing warm reset signals to individual application groups 186, 188. Further, the hardware monitoring circuitry 130 monitors for severe hardware faults from the application circuitry 180 and is capable of providing a "cold reset" signal to the MCU 170 that causes the main MCU power supply to cycle OFF then back ON in response to a severe hardware fault.

The PMIC includes group control circuitry 140 that is triggered by the program monitoring circuitry 120 or the hardware monitoring circuitry 130 to generate safe state control signals that control system components in a failsafe mode. In one example, the safe state control signals are logic signals intended to disable application actuators so that the application is disconnected (powered off or simply isolated from the overall system properly controlling the actuators) so that the MCU 170 is not erroneously driven by application actuators in the presence of a fault condition. The safe state control signals may be provided to the application circuitry 180, individual application group(s) 186, 188, or directly to system components instead of or in addition to control signals provided to the system components by the application circuitry 180 or application groups 186, 188.

Figure 2:
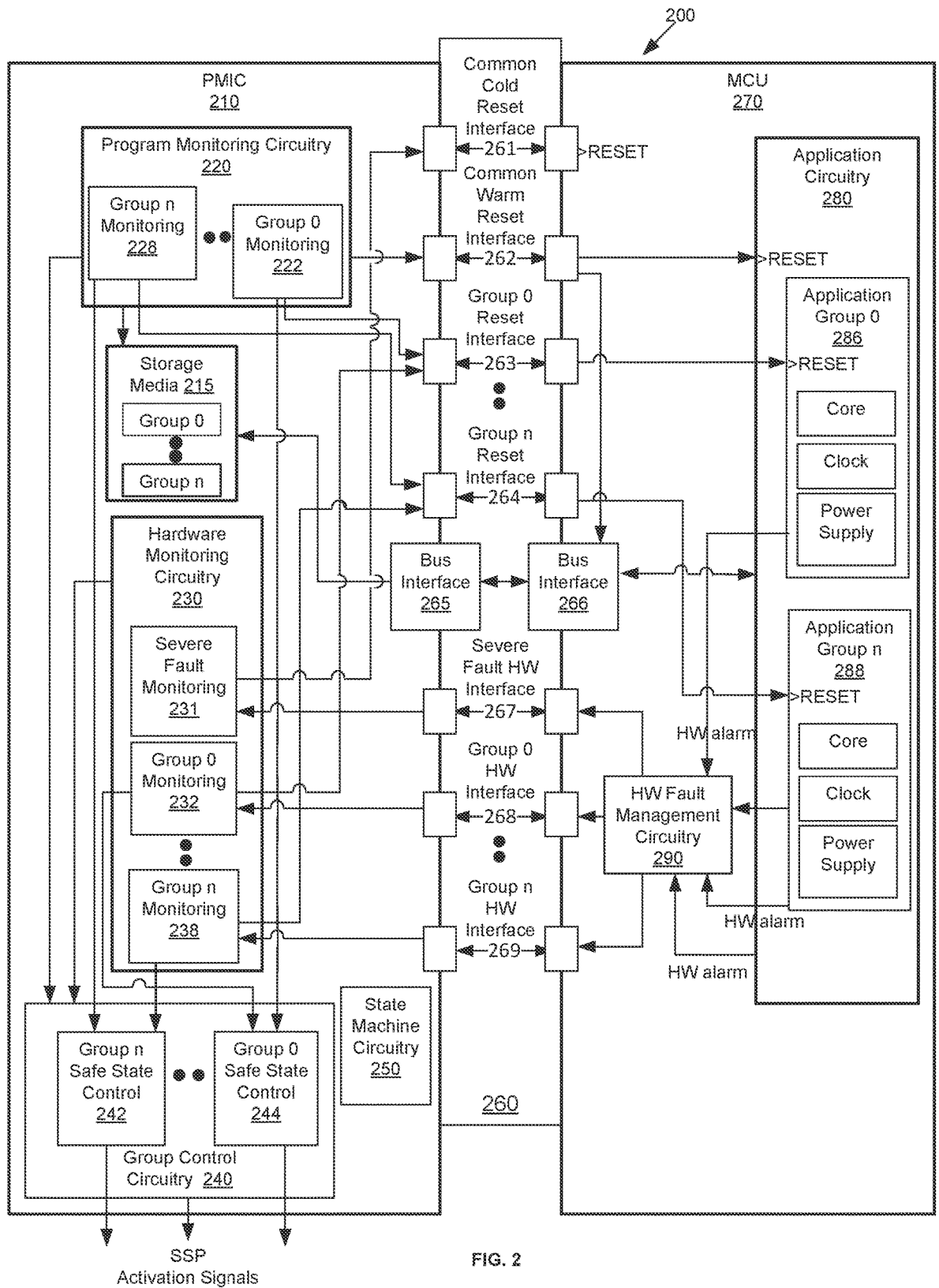
FIG. 2 is a block diagram of an exemplary control system that supports safety management on a per-application group basis, in accordance with various aspects described.

Referring now to FIG. 2, a more detailed block diagram of an exemplary control system 200 is illustrated. The control system 200 includes PMIC 210, interface 260, and MCU 270. The interface 260 includes several interfaces configured to couple the PMIC 210 to the MCU 270. The individual interfaces will be described in the context of their function below. The MCU 270 includes application circuitry 280 having a common reset input that is coupled to a common warm reset input of the PMIC 210 by way of common warm reset interface 262. The common reset function, when triggered by the common reset input, resets multiple applications. For example, if a power supply rail that supplies power to hardware components in multiple application groups fails, the common reset function can be triggered to reset multiple application groups. Hardware components of the application circuitry 280 are grouped into application groups 286, 288 as described above. In the illustrated example, each application group includes a dedicated processor core, clock system, and power supply that function independently of applications not in the application group.

The MCU 270 includes hardware fault management circuitry 290 that accumulates hardware alarm signals from the hardware components in the application circuitry 280. The hardware fault management circuitry 290 maps the hardware alarm signals to one of the application groups or to a common designation that indicates the hardware performs functions of more than one application group. Hardware alarm signals may be flags or interrupts or other alarm signals. In one example, the mapping operation performed by hardware fault management circuitry 290 may be controlled or modified so that the grouping of hardware into the various application groups may be changed (e.g., by a safety system designer). Based on the mapping between a received hardware alarm signal and an application group (or common group designation), the hardware fault management circuitry 290 provides hardware status signals to the PMIC via severe fault hardware interface 267, group 0 hardware interface 268, or group n hardware interface 269.

A bus interface 265 provides the application circuitry 280 and individual application groups 286, 288 access to PMIC storage media 215 and state machine circuitry 250. The storage media 215 includes resources (e.g., registers) that are individually mapped to an application group 286, 288 or to the application circuitry 180. The application circuitry 280 or application groups 286, 288 can control the content of their mapped storage media to communicate information related to program status (e.g., via Window or Q/A watchdogs). In one example, the bus interface 265 is a serial peripheral interface (SPI) or inter-integrated circuit (I2C) interface. While only one HW interface is shown for each application group, in some examples, multiple HW interfaces may be used for some or all application groups.

The PMIC 210 includes hardware monitoring circuitry 230 that includes monitoring modules for severe fault monitoring 231 and individual application group hardware monitoring (e.g., group 0 hardware monitoring 232, and group n hardware monitoring 238). A module may be implemented using hardware components and/or a processor executing stored instructions for monitoring signals being received on interfaces 267, 268, 269 and generating appropriate reset signals in response. When the severe fault monitoring module 231 detects a severe hardware fault, it generates a common cold reset signal that is provided to common cold reset interface 261. This signal is provided to a cold reset input of the MCU 270 and resets the MCU 270 (e.g., by cycling a main power supply of the MCU OFF and then ON).

Optionally, the severe fault monitoring module may generate a warm reset signal provided to the application circuitry 280 when a less severe hardware fault is detected or when hardware faults are detected in several different application groups. When the group hardware monitoring module 232 detects a hardware fault via interface 268, the module 232 generates a reset signal that is provided to application group 0 via group 0 reset interface 263. When the group hardware monitoring module 238 detects a hardware fault via interface 269, the module 238 generates a reset signal that is provided to application group n via group n reset interface 264.

Program monitoring circuitry 220 monitors the storage media 215 to determine program flow status of the application circuitry 280. When information is stored in in the storage media 215 that indicates a software error associated with the application circuitry 280 or common to several application groups has occurred, the program monitoring circuitry 220 generates a warm reset signal that is provided to the application circuitry 280 by way of common warm reset interface 262. Program monitoring circuitry 220 includes monitoring modules for individual application group software monitoring (e.g., group 0 software monitoring circuitry 222, and group n software monitoring circuitry 228). A module may be implemented using hardware components and/or a processor executing stored instructions for monitoring the content of selected portions of storage media 215 and generating appropriate reset signals in response.

For example, when the group software monitoring module 222 detects a software or program flow fault based on information stored in the group 0 storage media (e.g., register), the module 222 generates a reset signal that is provided to an application specific reset input for application group 0 via group 0 application specific interface 263. When the group software monitoring module 228 detects a software or program flow fault based on information stored in the group n storage media (e.g., register), the module 228 generates a reset signal that is provided to an application specific reset input for application group n via group n application specific interface 264.

The program monitoring circuitry 220 maps different storage media to the different application groups. In one example, the mapping operation performed by program monitoring circuitry 220 may be adjustable so that the mapping of storage media to the various application groups may be changed (e.g., by a safety system designer).

Group control circuitry 240 receives status signals from program monitoring circuitry 220, hardware monitoring circuitry 230, individual group hardware monitoring modules 232, 238, and individual group software monitoring modules 222, 228. Based on these signals, the group control circuitry 240 provides individual (e.g., per application group) control signals and secondary safety path (SSP) activation signals. In one example, SSP activation signals disconnect specific applications from loads/actuators thereby isolating an application that is experiencing a fault condition from the system to avoid propagation of faults to other applications. The group control circuitry 240 may also provide a common SSP activation signal that activates SSP for all application groups when a severe hardware fault or common software error is detected.

State machine circuitry 250 provides state management and state retention information for each application group and/or all application groups as a whole for various hardware faults and software errors and corresponding safety reactions and state transitions. The state machine circuitry 250 allows the PMIC to reach specific states where SSP activation signals, individual power supply rails, and alarms can be triggered according to specific configurations of the various fault conditions monitored by program monitoring circuitry 220 and hardware monitoring circuitry 230. For example, when a severe fault is detected, the system (e.g., the MCU 270 and components controlled by the MCU 270) may be moved into FAILSAFE or the system, or a subset, may be re-initialized.

The isolation of application groups provided by the control systems 100, 200 provides the possible mapping of application function from a failed application group to another working application group. Faster recovery from a hardware fault or software error is likely because only those hardware components associated with the application group may be reset as compared to resetting the entire MCU. The described control systems provide individual activation of SSP signals to different application groups, allowing unaffected groups to function normally. In addition to containing hardware components associated with different system functions, the different application groups may contain sets of redundant hardware that provide a fail-operational functionality by activating a different application group when a first application group fails.

Figure 3:
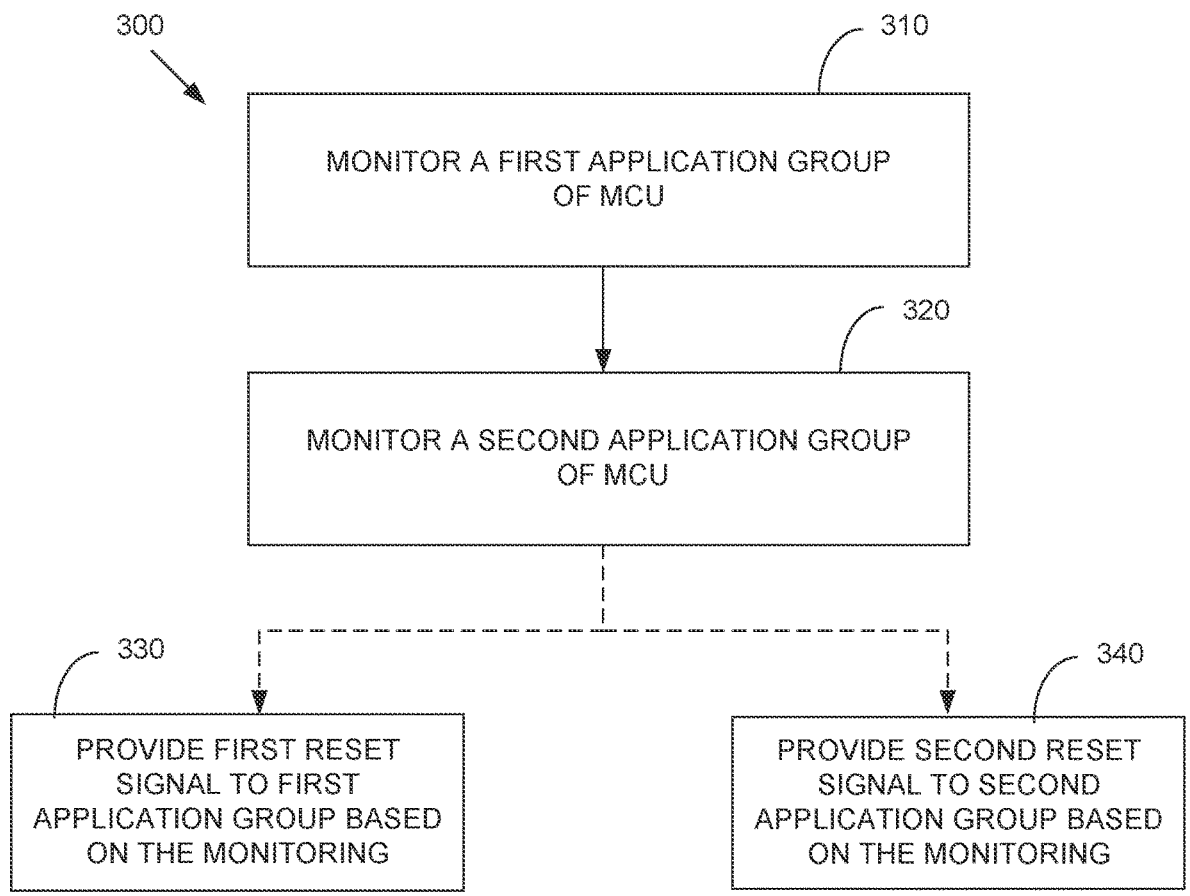
FIG. 3 is a flow diagram outlining an example method for safety management on a per-application group basis in accordance with various aspects described.

FIG. 3 is a flow diagram outlining an exemplary method 300 for safety management on a per-application group basis. The method includes, at 310, monitoring a first application group of a microcontroller unit (MCU) to detect a first application group fault condition and, at 320, monitoring a second application group of the MCU to detect a second application group fault condition. The first application group includes at least one hardware component not associated with the second application group. Based on the monitoring, at 330, the method includes providing a first reset signal to the first application group that does not reset the second application group or, at 340, providing a second reset signal to the second application group that does not reset the first application group. In one example, depending on the monitoring, the method may include providing both the first and second reset signal to the first application group and second application group, respectively.

It can be seen from the foregoing description that the described systems, circuitries, and methods allow for safety management on a per-application group basis. This increases the level of end-system availability through power management measures and provides increased granularity in MCU monitoring and safe state activation elements, as well as status retention of the safe state activation.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to provide safety management on a per-application group basis according to embodiments and examples described herein.

Example 1 is a control system, including a microcontroller unit (MCU) including a first application group and a second application group, wherein the first application group includes at least one hardware component not associated with the second application group; and a power management integrated circuit (PMIC), The PMIC includes monitoring circuitry configured to monitor the first application group to detect a first application group fault condition and monitor the second application group to detect a second application group fault condition; and based on the monitoring, provide a first reset signal to the first application group that does not reset the second application group or provide a second reset signal to the second application group that does not reset the first application group.

Example 2 includes the subject matter of example 1, including or omitting optional elements, wherein the PMIC includes program monitoring circuitry configured to monitor a program status of the first application group and a program status of the second application group; and based on the program status monitoring, provide the first reset signal, provide the second reset signal, or provide both the first reset signal and the second reset signal.

Example 3 includes the subject matter of example 1, including or omitting optional elements, wherein the PMIC includes hardware monitoring circuitry configured to monitor a hardware status of the first application group and a hardware status of the second application group; and based on the hardware status monitoring, provide the first reset signal, provide the second reset signal, provide both the first reset signal and the second reset signal, or provide a cold reset signal to the MCU.

Example 4 includes the subject matter of example 1, including or omitting optional elements, further including a bus interface connecting the MCU to the PMIC, wherein the MCU is configured to access resources on the PMIC by way of the bus interface.

Example 5 includes the subject matter of example 1, including or omitting optional elements, wherein the PMIC includes first storage media allocated to the first application group and second storage media allocated to the second application group; the first application group is configured to store information related to program status in the first storage media and the second application group is configured to store information related to program status in the second storage media, the PMIC includes first group software monitoring circuitry configured to monitor the first storage media to determine a first program status of the first application group and second group software monitoring circuitry configured to monitor the second storage media to determine a second program status of the second application group; and wherein the PMIC provides the first reset signal, the second reset signal, or both the first reset signal and the second reset signal based on the first program status and the second program status.

Example 6 includes the subject matter of example 1, including or omitting optional elements, wherein the PMIC includes state machine circuitry that provides, for each application group, state retention information and state management information defining state transitions in response to fault conditions; the first application group is configured to access the state machine circuitry and control operation of the first application group based on the state retention information and state management information for the first application group; and the second application group is configured to access the state machine circuitry and control operation of the second application group based on the state retention information and state management information for the second application group.

Example 7 includes the subject matter of example 1, including or omitting optional elements, wherein the PMIC further includes group control circuitry configured to provide first safe state control signals to adjust operation of components in response to detecting a first application group fault and second safe state control signals to adjust operation of components in response to detecting a second application group fault.

Example 8 includes the subject matter of example 1, including or omitting optional elements, wherein the MCU further includes hardware fault management circuitry configured to receive hardware alarm signals indicative of hardware faults in the MCU; map the received hardware alarm signals to the first application group, the second application group, or a common group shared by the first application group and the second application group; and based on the mapping, provide a hardware status signal to the PMIC.

Example 9 includes the subject matter of example 1, including or omitting optional elements, wherein the at least one hardware component not associated with the second application group includes a processor core, a power supply, or a clock.

Example 10 is a method, including monitoring a first application group of a microcontroller unit (MCU) to detect a first application group fault condition; monitoring a second application group of the MCU to detect a second application group fault condition, wherein the first application group includes at least one hardware component not associated with the second application group; and based on the monitoring, providing a first reset signal to the first application group that does not reset the second application group, or providing a second reset signal to the second application group that does not reset the first application group.

Example 11 includes the subject matter of example 10, including or omitting optional elements, including: monitoring a first program status of the first application group; monitoring a second program status of the second application group; providing the first reset signal based on the first program status; and providing the second reset signal based on the second program status.

Example 12 includes the subject matter of example 11, including or omitting optional elements, including storing the first program status of the first application group in a first storage media; storing the second program status of the second application group in a second storage media; monitoring the first storage media to determine the first program status; and monitoring the second storage media to determine the second program status.

Example 13 includes the subject matter of example 12, including or omitting optional elements, wherein the first storage media and the second storage media are disposed in a power management integrated circuit (PMIC) connected to the MCU by a bus.

Example 14 includes the subject matter of example 10, including or omitting optional elements, controlling operation of the first application group based on state retention information and state management information for the first application group; and controlling operation of the second application group based on state retention information and state management information for the second application group.

Example 15 includes the subject matter of example 10, including or omitting optional elements, including providing first safe state control signals to adjust operation of first components in response to detecting a first application group fault; and providing second safe state control signals to adjust operation of second components in response to detecting a second application group fault.

Example 16 includes the subject matter of example 10, including or omitting optional elements, including monitoring a hardware status of the first application group; monitoring a hardware status of the second application group; providing the first reset signal based on the hardware status monitoring; and providing the second reset signal based on the hardware status monitoring.

Example 16 includes the subject matter of example 10, including or omitting optional elements, including receiving hardware alarm signals indicative of hardware faults in the MCU; mapping the received hardware alarm signals to the first application group, the second application group, or a common group shared by the first application group and the second application group; and based on the mapping, providing the first reset signal and the second reset signal.

Example 18 includes the subject matter of example 10, including or omitting optional elements, wherein the at least one hardware component not present in the second application group is a processor core, a power supply, or a clock.

Example 19 is an interface, including a first application specific interface configured to couple a first application specific reset input of a first application group in a microcontroller unit (MCU) to a power management integrated circuit (PMIC); and a second application specific interface configured to couple a second application specific reset input of a second application group in the MCU to the PMIC, wherein the first application group includes at least one hardware component not associated with the second application group.

Example 20 includes the subject matter of example 19, including or omitting optional elements, further including a common warm reset interface configured to couple a common warm reset input of application circuitry in the MCU to program monitoring circuitry in the PMIC.

Example 21 includes the subject matter of example 19, including or omitting optional elements, further including a cold reset interface configured to couple a cold reset input of the MCU to hardware monitoring circuitry in the PMIC.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example A or B is to be construed as include only A, only B, and both A and B. Further the phrase "one or more of" followed by A, B, or C is to be construed as including A, B, C, AB, AC, BC, and ABC.

What is claimed is:

1. A control system, comprising:
   a microcontroller unit (MCU) comprising a first application group and a second application group, wherein the first application group comprises at least one hardware component not associated with the second application group; and
   a power management integrated circuit (PMIC) comprising monitoring circuitry configured to
      monitor the first application group to detect a first application group fault condition and monitor the second application group to detect a second application group fault condition; and
      based on the monitoring, provide a first reset signal to the first application group that does not reset the second application group or provide a second reset signal to the second application group that does not reset the first application group.

2. The control system of claim 1 wherein the PMIC comprises program monitoring circuitry configured to:
   monitor a program status of the first application group and a program status of the second application group; and
   based on the program status monitoring, provide the first reset signal, provide the second reset signal, or provide both the first reset signal and the second reset signal.

3. The control system of claim 1, wherein the PMIC comprises hardware monitoring circuitry configured to:
   monitor a hardware status of the first application group and a hardware status of the second application group; and
   based on the hardware status monitoring, provide the first reset signal, provide the second reset signal, provide both the first reset signal and the second reset signal, or provide a cold reset signal to the MCU.

4. The control system of claim 1, further comprising a bus interface connecting the MCU to the PMIC, wherein the MCU is configured to access resources on the PMIC by way of the bus interface.

5. The control system of claim 1, wherein:
   the PMIC comprises first storage media allocated to the first application group and second storage media allocated to the second application group;

the first application group is configured to store information related to program status in the first storage media and the second application group is configured to store information related to program status in the second storage media, the PMIC comprises first group software monitoring circuitry configured to monitor the first storage media to determine a first program status of the first application group and second group software monitoring circuitry configured to monitor the second storage media to determine a second program status of the second application group; and wherein the PMIC provides the first reset signal, the second reset signal, or both the first reset signal and the second reset signal based on the first program status and the second program status.

6. The control system of claim 1, wherein:

the PMIC comprises state machine circuitry that provides, for each application group, state retention information and state management information defining state transitions in response to fault conditions;

the first application group is configured to access the state machine circuitry and control operation of the first application group based on the state retention information and state management information for the first application group; and the second application group is configured to access the state machine circuitry and control operation of the second application group based on the state retention information and state management information for the second application group.

7. The control system of claim 1, wherein the PMIC further comprises group control circuitry configured to provide first safe state control signals to adjust operation of components in response to detecting a first application group fault and second safe state control signals to adjust operation of components in response to detecting a second application group fault.

8. The control system of claim 1, wherein the MCU further comprises hardware fault management circuitry configured to:

receive hardware alarm signals indicative of hardware faults in the MCU;

map the received hardware alarm signals to the first application group, the second application group, or a common group shared by the first application group and the second application group; and based on the mapping, provide a hardware status signal to the PMIC.

9. The control system of claim 1, wherein the at least one hardware component not associated with the second application group comprises a processor core, a power supply, or a clock.

10. A method, comprising:

monitoring a first application group of a microcontroller unit (MCU) to detect a first application group fault condition;

monitoring a second application group of the MCU to detect a second application group fault condition, wherein the first application group comprises at least one hardware component not associated with the second application group; and based on the monitoring, providing a first reset signal to the first application group that does not reset the second application group, or providing a second reset signal to the second application group that does not reset the first application group.

11. The method of claim 10, comprising:

monitoring a first program status of the first application group;

monitoring a second program status of the second application group;

providing the first reset signal based on the first program status; and providing the second reset signal based on the second program status.

12. The method of claim 11, comprising:

storing the first program status of the first application group in a first storage media;

storing the second program status of the second application group in a second storage media;

monitoring the first storage media to determine the first program status; and monitoring the second storage media to determine the second program status.

13. The method of claim 12, wherein the first storage media and the second storage media are disposed in a power management integrated circuit (PMIC) connected to the MCU by a bus.

14. The method of claim 10, comprising:

controlling operation of the first application group based on state retention information and state management information for the first application group; and controlling operation of the second application group based on state retention information and state management information for the second application group.

15. The method of claim 10, comprising:

providing first safe state control signals to adjust operation of first components in response to detecting a first application group fault; and providing second safe state control signals to adjust operation of second components in response to detecting a second application group fault.

16. The method of claim 10, comprising:

monitoring a hardware status of the first application group;

monitoring a hardware status of the second application group;

providing the first reset signal based on the hardware status monitoring; and providing the second reset signal based on the hardware status monitoring.

17. The method of claim 16, comprising:

receiving hardware alarm signals indicative of hardware faults in the MCU;

mapping the received hardware alarm signals to the first application group, the second application group, or a common group shared by the first application group and the second application group; and based on the mapping, providing the first reset signal and the second reset signal.

18. The method of claim 10, wherein the at least one hardware component not present in the second application group is a processor core, a power supply, or a clock.

19. An interface, comprising:

a first application specific interface configured to couple a first application specific reset input of a first application group in a microcontroller unit (MCU) to a power management integrated circuit (PMIC); and a second application specific interface configured to couple a second application specific reset input of a second application group in the MCU to the PMIC, wherein the first application group comprises at least one hardware component not associated with the second application group.

20. The interface of claim 19, further comprising:
a common warm reset interface configured to couple a common warm reset input of application circuitry in the MCU to program monitoring circuitry in the PMIC.

21. The interface of claim 19, further comprising:
a cold reset interface configured to couple a cold reset input of the MCU to hardware monitoring circuitry in the PMIC.

* * * * *